G. HAYES.

Skylights.

No. 5,693. Reissued Dec. 23, 1873.

Witnesses:
Michael Ryan
Fred Haines

George Hayes
by his Attorney.
Benn Pitman

AM. PHOTO-LITHOGRAPHIC Co. N.Y. (OSBORNE'S PROCESS)

UNITED STATES PATENT OFFICE.

GEORGE HAYES, OF NEW YORK, N. Y.

IMPROVEMENT IN SKYLIGHTS.

Specification forming part of Letters Patent No. 100,143, dated February 22, 1870; reissue No. 5,693, dated December 23, 1873; application filed November 1, 1873.

*To all whom it may concern:*

Be it known that I, GEORGE HAYES, of the city, county, and State of New York, have invented certain new and useful Improvements in the Construction of Skylights, Conservatory and other Glazed Roofs or Structures, of which the following is a specification:

This invention relates to skylights, conservatory and other glazed metal roofs or structures; and consists in certain novel constructions of parts, whereby, while every provision is made for expansion and contraction without straining the parts or breakage of the glass, lightness and strength are secured to the structure, and the latter may be put together cheaply and expeditiously, leakage is avoided, lapping of the glasses may be dispensed with, also putty to secure them, likewise provision made for carrying off water passing any of the joints, and, by using galvanized sheet metal, paint is rendered unnecessary.

Figure 1:
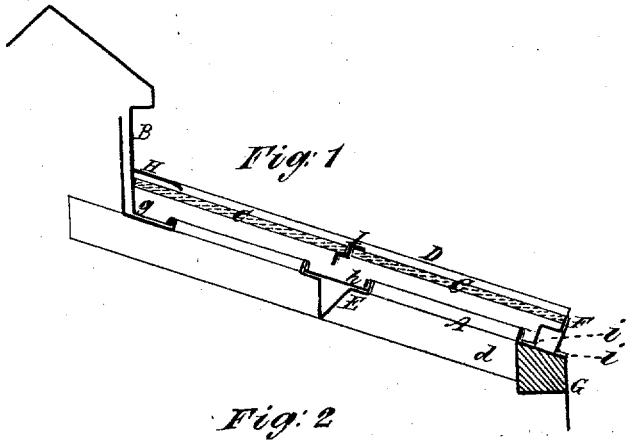
Figure 2:
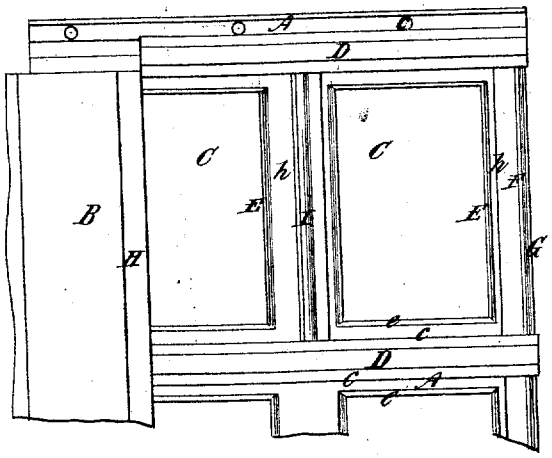
Figure 3:
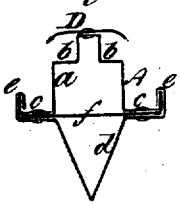
Figure 4:
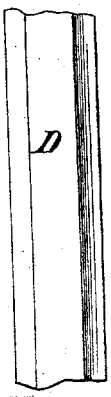
Figure 5:
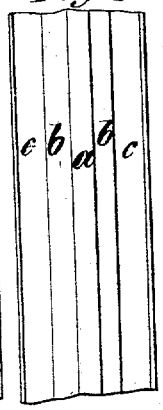
Figure 6:
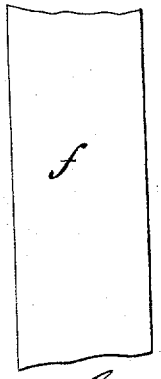
Figure 7:
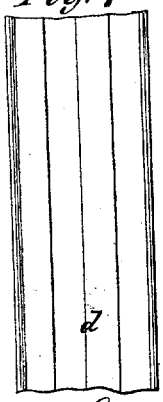

In the accompanying drawing, Figure 1 represents a vertical section of the one half or portion of a conservatory-roof constructed according to my invention; Fig. 2, a plan of the same in part; Fig. 3, a transverse section, on a larger scale, of a metallic box, with its gutters and attachments, used in the construction of said roof; and Figs. 4, 5, 6, and 7, plan views of details of the same.

Similar letters of reference indicate corresponding parts.

One or a prominent feature of this invention is a hollow metallic bar or rafter, A, of which there may be any number in the structure, according to the size of the roof, and which, in connection with cross-beams or transoms, form the main supports of the roof, and, as applied to a conservatory-roof, run from the ventilator B to the curbing. Said hollow bars A are composed of a sheet-metal body, *a*, bent to form rabbets *b b* for support of the panes or plates of glass C along their one side or edge, and gutters *c c* for the escape of water beating or leaking into the structure. To give this hollow metallic bar or rafter A the appearance of a solid molded bar, and at the same time to stiffen or strengthen it, a lower V or other suitably shaped sheet-metal molding, *d*, may be arranged to brace the body *a* of the bar, and so that it forms a part of the latter, such sheet-metal molding *d* being bent at its upper edges to overlap and clip the upper edges of the gutters *c c*, as at *e e;* or the hollow bar *a* may be stiffened at the base of its body *a* by a flat metal stay-plate, *f*, the same being secured to the bar by rivets through the gutters *c c;* or both the molding *d* and stay-plate *f* may be used, the latter being arranged between the molding and base of the body *a* of the bar, and the whole being secured together by rivets passing through the gutters *c c*. The glasses C may be secured in the rabbets *b b* by means of sheet-metal caps D soldered onto the top of the bar A, no putty in such case being necessary to secure the glass. The ventilator B may be of any suitable construction, and is made to communicate, by apertures *g*, with gutters in the cross-beams that connect with the main gutters *c c* of the bars A, to carry off the water formed by condensation or leakage. E E are the cross-beams or transoms, also formed hollow and of sheet metal, and provided on top with gutters *h*, connecting at their ends with the main gutters *c c*. The glasses C are arranged so that, instead of lapping the one over the other, they form butted joints, as it were, to accomplish which they have associated with them, as a necessary element, under cross-gutters *h*, which receive any leakage or water of condensation and conduct the same to the main gutters *c c*. Said glasses are restrained from sliding out of place by the lowermost of them entering within and being stopped or supported by the rabbeted portion of a foot-strip, F, which projects upward from what is termed the "frame" G of the roof or skylight, which portion G or frame lies over the usual wood or other curbing when the roof is fitted to its place on the building. H is a strip of metal arranged to project from the ridge ventilator over the glass at its top to prevent leakage past the upper edge of the top glasses. I is a metal clip, constructed to form a lap under and over the adjacent edges of the glasses in a crosswise direction to the base A, and extending so that they are covered at their ends by the cap-plates D. These clips aid in causing any water which may not pass over them to the foot of the roof, but which leaks through the joints of the glasses, to find its way into the cross-gutters *h*.

By the construction as here shown and described, any water formed by condensation, or by leakage past any of the joints, is conducted by the main and cross gutters to the foot of the roof or skylight, and finally delivered by or through outlets *i* in the base of the foot-strip F, free from all exposure of air or wind entering the structure by the outlets provided for carrying off the water.

I claim as my invention, and desire to secure by Letters Patent—

1. The metallic bar or rafter A, formed of a hollow sheet-metal body, *a*, constructed and arranged to form rabbets *b b* for the glasses and gutters *c c*, substantially as specified.

2. The stay-plate *f*, in combination with the hollow sheet-metal bar or rafter A, composed of a main body, *a*, rabbets *b b* for the glasses, and gutters *c c*, essentially as described.

3. The hollow molding *d*, in combination with the hollow sheet-metal bar or rafter A, having a main body, *a*, rabbets *b b* for the glasses, and gutters *c c*, substantially as specified.

4. The metallic bar or rafter A, formed of a hollow sheet-metal body, *a*, stay-plate *f*, and hollow molding *d*, fitted together and arranged to form rabbets *b b* for the glasses, and gutters *c c*, essentially as specified.

5. The combination of the cap-plates D with the hollow metal bars or rafters A, essentially as shown and described.

6. The combination of the cross-gutters *h* with the glasses C, arranged to form a butted joint, substantially as described.

7. The clips I, in combination with the cross-gutters *h* and main gutters *c c*, essentially as specified.

8. The foot-strip F, arranged to project upward from the frame G for the lowermost glasses to rest against, in combination with the main gutter *c*, cross-gutters *h*, and outlets *i*, substantially as specified.

Witnesses: GEORGE HAYES.

MICHAEL RYAN,

FRED. HAYNES.